US012608008B2

(12) United States Patent
Fujimoto

(10) Patent No.: US 12,608,008 B2
(45) Date of Patent: Apr. 21, 2026

(54) INSPECTING INDUSTRIAL FACILITIES USING SENSOR PACKAGES

(71) Applicant: Yokogawa Electric Corporation, Tokyo (JP)

(72) Inventor: Naoyuki Fujimoto, Addison, TX (US)

(73) Assignee: Yokogawa Electric Corporation, Tokyo (JP)

( * ) Notice: Subject to any disclaimer, the term of this patent is extended or adjusted under 35 U.S.C. 154(b) by 256 days.

(21) Appl. No.: 17/950,791

(22) Filed: Sep. 22, 2022

(65) Prior Publication Data

US 2024/0103528 A1 Mar. 28, 2024

(51) Int. Cl.
*G05D 1/00* (2024.01)
*G01C 21/20* (2006.01)

(52) U.S. Cl.
CPC ......... *G05D 1/0274* (2013.01); *G01C 21/206* (2013.01)

(58) Field of Classification Search
CPC .... G05D 1/0274; G05D 1/247; G05D 1/6987; G05D 2105/40; G05D 2105/85; G05D 2107/70; G05D 2109/20; G05D 2111/30; G05D 1/689; G01C 21/206; G01C 21/20
See application file for complete search history.

(56) References Cited

U.S. PATENT DOCUMENTS 9,853,712 B2    12/2017  Jalali
10,476,581 B2    11/2019  Fan et al.
10,757,596 B2    8/2020  Akdeniz et al.
12,130,204 B2 *  10/2024  Aubrey ................. B64U 10/13
2016/0070261 A1 *  3/2016  Heilman ................. G08G 5/57
701/2
2020/0252122 A1    8/2020  Tofighbakhsh et al.
(Continued)

FOREIGN PATENT DOCUMENTS

JP          202164878          4/2021
JP          2021064878 A  *  4/2021

OTHER PUBLICATIONS

Machine translation—JP2021064878A (Year: 2021).*
(Continued)

*Primary Examiner* — Scott A Browne
*Assistant Examiner* — Lidia Kwiatkowska
(74) *Attorney, Agent, or Firm* — Gray Ice Higdon

(57) ABSTRACT

Implementations are described herein for inspecting industrial facilities using remote sensor packages and wireless access points (WAPs) carried by mobile robots. In various implementations, aspect(s) of an industrial process facility may be monitored using sensor package(s). The sensor package(s) may generate one or more sensor signals, and based on the one or more sensor signals, detect anomal(ies) of the monitored aspect(s) of the industrial facility. Responsive to detecting anomal(ies), the sensor package(s) may modulate a long-range low-bandwidth (LR-LB) signal to indicate detection of the anomal(ies) in the monitored aspect(s) of the industrial process facility. Another component of the industrial facility may identify LR-LB signal(s) representing detection of anomal(ies) by sensor package(s) and instruct mobile robot(s) to travel to area(s) of the industrial facility to receive sensor data carried by a short-range high-bandwidth (SR-HB) signal emanating from that area.

20 Claims, 6 Drawing Sheets

(56) References Cited

U.S. PATENT DOCUMENTS

2020/0354056 A1    11/2020  Borras
2023/0061934 A1*    3/2023  Stein .................. G01M 99/005

OTHER PUBLICATIONS

Dimitrios et al., "A Network Architecture for High vol. Data Collection in Agricultural Applications" 2019 15th International Conference on Distributed Computing in Sensor Systems (DCOSS), Santorini Island, Greece, May 29-31, pp. 578-583. doi: 10.1109/DCOSS.2019.00107.

Japan Patent Office; Notice of Refusal issued for Application No. 2023-155669, 6 pages, dated Sep. 2, 2024.

* cited by examiner

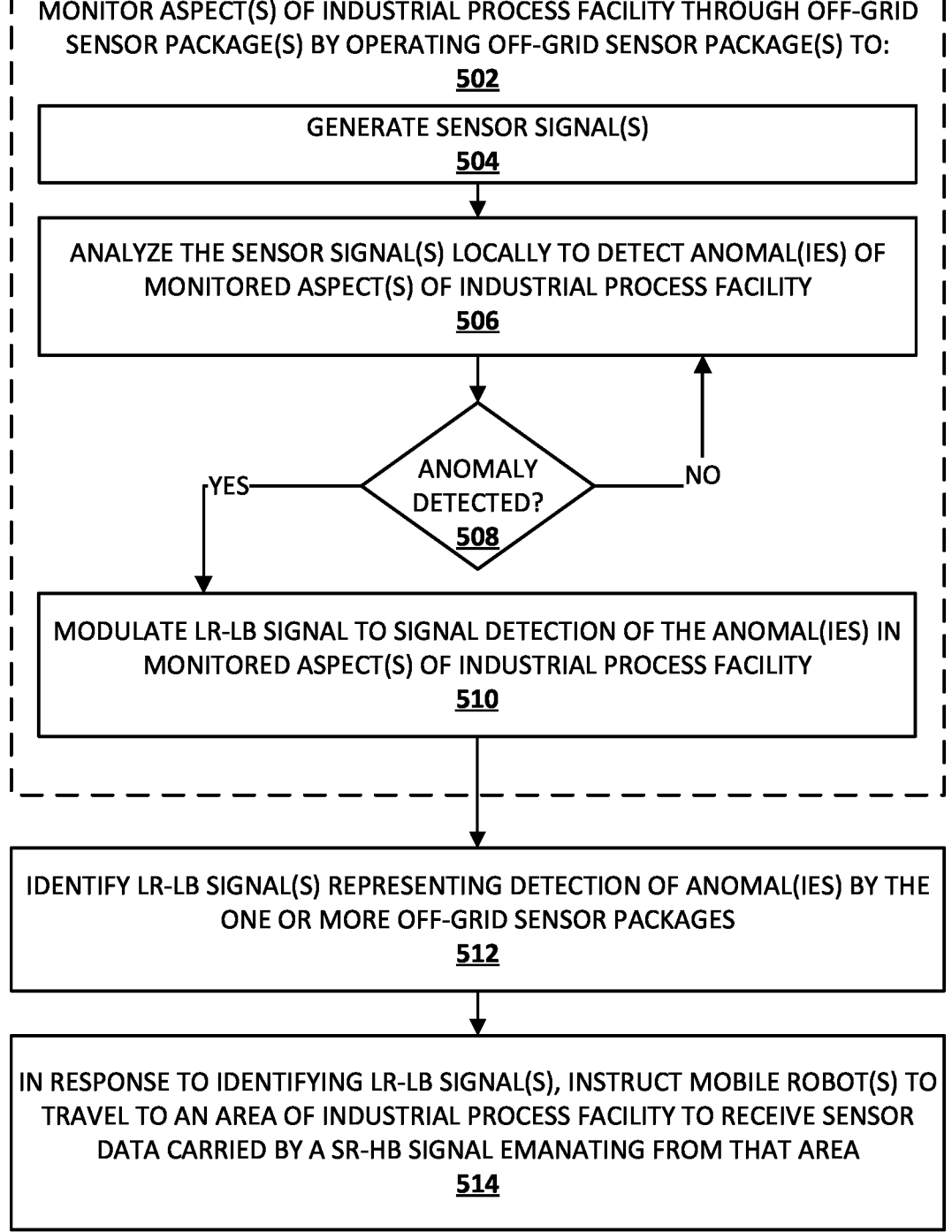

MONITOR ASPECT(S) OF INDUSTRIAL PROCESS FACILITY THROUGH OFF-GRID
SENSOR PACKAGE(S) BY OPERATING OFF-GRID SENSOR PACKAGE(S) TO:
502

GENERATE SENSOR SIGNAL(S)
504

ANALYZE THE SENSOR SIGNAL(S) LOCALLY TO DETECT ANOMAL(IES) OF
MONITORED ASPECT(S) OF INDUSTRIAL PROCESS FACILITY
506

ANOMALY
DETECTED?
508

YES                    NO

MODULATE LR-LB SIGNAL TO SIGNAL DETECTION OF THE ANOMAL(IES) IN
MONITORED ASPECT(S) OF INDUSTRIAL PROCESS FACILITY
510

IDENTIFY LR-LB SIGNAL(S) REPRESENTING DETECTION OF ANOMAL(IES) BY THE
ONE OR MORE OFF-GRID SENSOR PACKAGES
512

IN RESPONSE TO IDENTIFYING LR-LB SIGNAL(S), INSTRUCT MOBILE ROBOT(S) TO
TRAVEL TO AN AREA OF INDUSTRIAL PROCESS FACILITY TO RECEIVE SENSOR
DATA CARRIED BY A SR-HB SIGNAL EMANATING FROM THAT AREA
514

INSPECTING INDUSTRIAL FACILITIES USING SENSOR PACKAGES

BACKGROUND

Process automation facilities such as oil or gas refineries, offshore platforms, etc. are often large and include numerous sensors and gauges. Some sensors may be connected to reliable communication networks having robust bandwidth, and therefore may be able to transmit all or at least a substantial portion of their sensor data to other nodes. However, other sensors may be deployed at remote and/or isolated locations. It may be costly and/or dangerous to run power and/or communication lines to these remote and/or isolated locations, e.g., because they include "explosion-proof" areas. Consequently, many of these remote/isolated sensors are battery powered and configured to communicate wirelessly. However, given the large geographic footprint of a typical process automation facility, as well as the numerous potential sources of wireless interference (e.g., metal piping and other metal infrastructure), the large number of such remote/isolated sensors, etc., deploying a sufficient number of static wireless access points (WAPs) to support all such sensors may also be impractical and/or dangerous.

SUMMARY

Implementations are described herein for inspecting industrial facilities using long range communication-constrained sensor packages and wireless access points (WAPs) carried by mobile robots. As used herein, "long range communication-constrained sensor packages," alternatively referred herein to as "LRCC sensor packages," "off-grid sensor packages," "remote sensor packages," or simply "sensor packages," refer to sensor packages that are incapable of directly and/or regularly exchanging large amounts of data with computing system(s) (referred to herein as "sensor-data-processing-nodes" or "SDPNs") intended to process the sensor data generated by the sensor packages, such as a central control room (CCR) server. For example, LRCC sensor packages may not be in wired network communication (e.g., Ethernet) with a SDPN, and may be deployed in remote areas of the facility that are outside short-range high-bandwidth (SR-HB) range of any WAPs capable of relaying large amounts of data to the SDPN.

Given the above-described attributes of LRCC sensor packages, obtaining data from LRCC sensor packages in an industrial process facility may present a variety of technical challenges. As one example, a LRCC sensor package may be in an area of the facility which may be difficult or dangerous to access. As another example, the sensor may be in a location that is so inaccessible or remote to make human inspection of the sensor impractical or impossible. As yet another example, as a result of a sensor being located at a remote and/or hard-to-reach location, a requirement of the facility to consistently check the sensor may require an undue amount of dedicated human resources.

In addition, an LRCC sensor package may be deployed to monitor one or more aspects of a process requiring quick action in response to anomalous behavior. If the anomalous data is not reported or considered when managing the process, the process may fail or be disrupted. If the process fails or is disrupted, the remaining aspects in the facility may also be negatively affected. As such, if LRCC sensor packages are not adequately monitored, the integrity of the entire facility may be jeopardized.

Accordingly, implementations are described herein for leveraging a mobile robot transporting a WAP to mitigate against these issues in various ways. More particularly, but not exclusively, techniques are described herein for establishing, between one or more LRCC sensor packages and/or one or more SDPNs, an ad hoc communications channel via a WAP which extends (synchronously or asynchronously) the limited communications range a LRCC sensor package may have.

For example, some LRCC sensor packages may be equipped with long-range low-bandwidth (LR-LB) transmitters that can transmit relatively small amounts of data over longer ranges than SR-HB transmitters. These LR-LB transmitters can be modulated with a "summons" that causes a mobile robot to carry a WAP to an area that is within wireless range of a short-range high-bandwidth (SR-HB) signal carrying relatively large amounts of data. In various implementations, the summons may include command(s) for the mobile robot to travel to a designated area. The summons may or may not include other commands or data as well, such as command(s) to establish SR-HB communication with one or more LRCC sensor packages, a trajectory to take, a priority level (which may cause the mobile robot to travel slower or faster), etc. This extension of the communications range enables the LRCC sensor package to communicate greater amounts of data to the SDPN. In various implementations, a mobile robot is configured to transport a WAP in SR-HB range of the same LRCC sensor package that summoned it, or to a different LRCC sensor package.

Implementations are also described herein for inspecting sensor packages by a mobile robot transporting a memory storage system. For instance, in some implementations, when the LRCC sensor package is located so remotely from any network access point of the industrial facility's network that a WAP cannot transmit the sensor data far enough to reach the facility's network while maintaining communication range with the LRCC sensor package, a mobile robot may be deployed to transport a memory storage system configured to record data from the sensor. In some implementations, the mobile robot may transport the memory storage system containing the recorded data to a facility network interface for direct upload. In some implementations, a mobile robot may transport both a memory storage system containing recorded data and a WAP. After the WAP enters into facility network communication range, the WAP may interface with the memory storage system and begin wirelessly transmitting data to the facility network.

With respect to the mobile robot, any mobile robot capable of transporting a WAP may be used. In some implementations, a mobile robot may be an unmanned aerial vehicle (UAV). In other implementations, a mobile robot may be a quadrupedal robot. In other implementations, a mobile robot may be a wheeled or tracked robot. Other variations of mobile robots are contemplated. An entity responsible for controlling and/or summoning the mobile robot(s), e.g., a mobile robot control center, may consider characteristics of mobile robot(s) and/or sensor(s) when determining when a particular mobile robot should be summoned to a sensor package. For example, a mobile robot control center may consider characteristics such as distance between mobile robot(s) and sensor package(s), whether certain types of mobile robots are required and/or better suited (i.e. explosion proof, aerial, miniature, etc.), and the equipment carried by the one or more mobile robot(s).

In some implementations, multiple mobile robots may be used for detection and inspection of a LRCC sensor package. For example, one or more mobile robots could be configured to travel about the facility within range of the LRCC sensor packages to monitor if an anomaly has been detected by a LRCC sensor package. One or more other mobile robots equipped with one or more WAPs may be summoned to the one or more LRCC sensor packages that potentially perceive the anomaly in response to the monitoring mobile robot detecting the anomaly. As another example of multiple mobile robots being used, two or more mobile robots, each equipped with a WAP, may be placed throughout a facility to daisy chain their respective WAP ranges together, in essence, creating an ad hoc mesh network by overlapping multiple WAP communication channels.

With respect to the WAP, various types of WAPs may be used. A WAP may be configured to receive LR-LB and/or SR-HB wireless input and/or modulate an outgoing wireless signal. In some implementations, a WAP may be configured to receive and/or transmit data an using a wired connection. In some embodiments, the wireless signal output by the WAP may include data identical to the data that the WAP received (e.g., the WAP may relay the data it receives). In other embodiments, the wireless signal output by the WAP may include data that has been modified after having been received by the WAP. In many embodiments, the WAP will interface with a sensor via a completely wireless SR-HB connection, such as Bluetooth, any protocol within the IEEE 802.11 family (e.g., Wi-Fi), or any other suitable SR-HB wireless communication standard. In other embodiments, the WAP may interface with a sensor using an at least partially wired—or more generally, galvanic—connection, such as Universal Serial Bus (USB).

The LRCC sensor packages may be of various types and varieties. In some implementations, LRCC sensor packages may include one or more sensors and other components. These other components may include logic such as one or more processors configured to execute instructions in memory, application-specific integrated circuits (ASICs), or field-programmable gate arrays (FPGAs), to name a few. In some implementations, the logic may implement or otherwise include an onboard anomaly detection unit configured to detect anomalies based on sensor data (e.g., based on raw analog sensor signals or digitized sensor data that is stored in memory), and to summon mobile robot(s) in response to detected anomalies.

As used herein, a "sensor" includes any device that responds to a physical stimulus (such as heat, light, sound, pressure, magnetism, or a particular motion) and transmits a resulting impulse (as for measurement of operating a control). One common example of a sensor may be a device used to sense a change in the environment (e.g. a change in temperature) and output a signal or measurement representing data regarding one or more aspects of that sensed change. Sensors may give an output in the same format as the input or may use a transducer to convert a measurement relating to one or more aspects of the input to an electrical signal. Sensors may sense aspects including temperature, humidity, pressure, proximity, level, acceleration, presence of one or more elements in a composition, and orientation, among other characteristics in a process or composition. In some cases, a sensor may incorporate gain, precision, and accuracy in determining an appropriate output signal. Sensors in general may be used in the inspection and monitoring of processes in a variety of domains, e.g., manufacture, development, and/or refinement of chemicals (e.g., chemical processing), catalysts, machinery, etc.

The one or more sensors onboard a LRCC sensor package may include a vibration sensor, a camera (which may include any image capturing device capable of capturing any number of spectral bands), infrared sensor, a light detection and ranging (LIDAR) sensor, a temperature sensor, a radiation detector (e.g., a Geiger counter), a pressure wave sensor (e.g., a microphone), a barometer, a humidity or moisture sensor, an olfactory sensor, and so forth. Other sensor variations are contemplated.

In some implementations, a LRCC sensor package may include one or more SR-HB transmitters, receivers, and/or modulators as additional components. In some implementations, a LRCC sensor package may include one or more LR-LB transmitters, receivers, and/or modulators as additional components. In some implementations, a LRCC sensor package may include both SR-HB and LR-LB transmitter(s), receiver(s), and/or modulator(s) as additional components.

In some implementations, if an anomaly is detected, e.g., by an anomaly detection unit, the anomaly detection unit may modulate (or cause to be modulated) a SR-HB signal. A SR-HB signal is adequate for transmitting high-bandwidth data over a short range. However, a SR-HB signal may have inadequate range to transmit high-bandwidth data to a facility network point without an intermediate node, such as a WAP carried by a mobile robot, effectively extending the SR-HB signal range (asynchronously or synchronously). In some implementations, a SR-HB signal may be modulated to carry raw sensor data that revealed an anomaly. In some implementations, a SR-HB signal may be modulated to carry a subset or plurality of subsets of raw sensor data regarding an anomaly.

In some implementations, if an anomaly is detected by an anomaly detection unit, the anomaly detection unit may modulate (or cause to be modulated) a LR-LB signal. A LR-LB signal has a range that is sufficient for transmitting low-bandwidth data to a facility network point but has insufficient bandwidth or throughput for carrying high-volume data to a facility network point. In some implementations, the LR-HB signal may be modulated to carry a subset of raw sensor data regarding an anomaly. The subset of raw sensor data may be analyzed by a receiving facility network point or other point located on a facility network to determine if a mobile robot should be sent to one or more LRCC sensor packages (or other areas that can be monitored) to further analyze the characteristics of a facility operation relating to the data subset transmitted over the LR-HB signal. A LR-LB signal may not be capable of carrying large amounts of sensor data from a LRCC sensor package practically and/or efficiently, e.g., because the bandwidth or throughput are too low and/or because such transmission would quickly deplete a battery of the LRCC sensor package.

In various implementations, the sensor packages may produce and store, e.g., in memory, raw sensor data based on sensor signals generated by their sensors. For example, the sensor packages may sample and/or digitize an analog signal generated by an onboard sensor, e.g., using an analog-to-digital (ADC) convertor, into digital raw sensor data. Various types of ADC convertors with various sampling rates or other parameters may be used depending on factors such as the type of sensor signal, the type of monitoring being performed, etc. These ADC convertors may include, for instance, direct-conversion, successive approximation, ramp-compare, Wilkinson, Integrating, Delta-encoded, pipelined, sigma-delta, time-interleaved, intermediate FM stage, and time-stretch, to name a few. In some implementations, the onboard sensor itself may be configured to generate a sensor signal that is natively in digital format, e.g., using an integrated ADC convertor.

To conserve energy and/or to account for the constrained computing resources of a LRCC sensor package, onboard anomaly detection units may process less than all of the raw sensor data, e.g., one or more subsets of the raw of sensor data, in order to detect anomalies. Subsets of raw sensor data may be obtained by, for instance, omitting portions of raw sensor data, amplifying anomalous data of raw sensor data for review, and/or superimposing prior iterations of similar data over the anomalous data, among other modifications. In some implementations, a subset of raw sensor data may simply include a low-bandwidth peak of anomalous data, which may be transmitted over a long-range low-bandwidth network. In some implementations, raw sensor data may include pre-recorded and/or real-time data that requires a high-bandwidth channel to transmit.

In various implementations, a mobile robot transports a WAP and a memory storage system through the industrial process facility into range of a sensor modulating a SR-HB signal. Upon detecting that the WAP range does not extend the SR-HB signal range far enough to reach a facility network point, the mobile robot interfaces a memory storage system and records data from the sensor. After data is recorded from a memory storage system and the mobile robot has transported the WAP back into range of the facility network point, the WAP transmits the data recorded on the memory storage system over the WAP communication channel to the facility network point.

In some implementations, a system may include one or more mobile robots, each configured to receive a summons and transport a wireless access point (WAP) in response to receipt of the summons. The system may also include one or more sensor packages located remote from the one or more mobile robots. In various implementations, the one or more sensor packages may be configured to: generate one or more sensor signals representing one or more aspects of an industrial process facility monitored by the one or more sensor packages; based on the one or more sensor signals, detect one or more anomalies of the one or more monitored aspects of the industrial process facility; modulate a long-range low-bandwidth (LR-LB) signal in response to detection of the one or more anomalies by one or more of the sensor packages in the monitored one or more aspects of the industrial process facility, said LR-LB signal modulated with the summons that causes one or more of the mobile robots to travel to an area within short-range high-bandwidth (SR-HB) range of one or more of the sensor packages; modulate a SR-HB signal with data indicative of one or more of the sensor signals generated by one or more of the sensor packages; and transmit the modulated SR-HB signal to the WAP transported by one or more of the mobile robots.

In various implementations, the one or more mobile robots may be further configured to: patrol an area in which one or more of the sensors are deployed; receive the LR-LB signal emitted by one or more of the sensors; and move into SR-HB range of one or more of the sensors upon receipt of said LR-LB signal.

In various implementations, the system may include: a mobile robot controller configured to: receive one or more LR-LB signals emitted by one or more of the sensor packages; and in response to receipt of said one or more LR-LB signals, direct one or more of the mobile robots to move within SR-HB range of the one or more sensors.

In various implementations, the one or more sensor packages may include a first sensor package and a second sensor package. The first sensor package may be configured to detect one or more of the anomalies and modulate the LR-LB signal with the summons to cause a given mobile robot of the one or more mobile robots to travel to within SR-HB range of the second sensor package. The second sensor package may be configured to modulates and transmit the SR-HB signal to the WAP carried by the given mobile robot. In various implementations, the first sensor may be a vibration sensor and the second sensor may be a camera.

In various implementations, one or more of the sensor packages may include a sensor package configured to: store raw sensor data based on one or more of the sensor signals; analyze a subset of the raw sensor data to detect one or more of the anomalies; and modulate the SR-HB signal with more than the raw sensor data. In various implementations, the one or more mobile robots may include one or more unmanned aerial vehicles (UAVs).

In a related aspect, a method may be implemented using one or more processors and may include: monitoring one or more aspects of an industrial process facility through one or more sensor packages. The monitoring may include operating said one or more sensor packages to: generate one or more sensor signals, based on the one or more sensor signals, detect, locally at the one or more sensor packages, one or more anomalies of the one or more monitored aspects of the industrial process facility, and responsive to detecting one or more anomalies, modulate a LR-LB signal to signal detection of the one or more anomalies in the monitored one or more aspects of the industrial process facility; identifying one or more LR-LB signals representing detection of one or more anomalies by the one or more sensor packages; and instructing, in response to identifying one or more LR-LB signals, one or more mobile robots to travel to an area of the industrial process facility to receive sensor data carried by a SR-HB signal emanating from that area.

In various implementations, the method may include receiving, in response to one or more of the mobile robots moving into range of the SR-HB signal, a transmission from a WAP carried by the one or more mobile robots, said transmission containing the sensor data received from the SR-HB signal emanating from that area. In various implementations, the SR-HB signal may be generated by the same sensor packages that generated the LR-LB signal. In various implementations, the SR-HB signal may be generated by a separate sensor package than the sensor package that generated the LR-LB signal. In various implementations, the one or more sensor packages may include one or both of a vibration sensor and a camera.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 5 illustrates an example method for performing selected aspects of the present disclosure.

DETAILED DESCRIPTION

Figure 1:
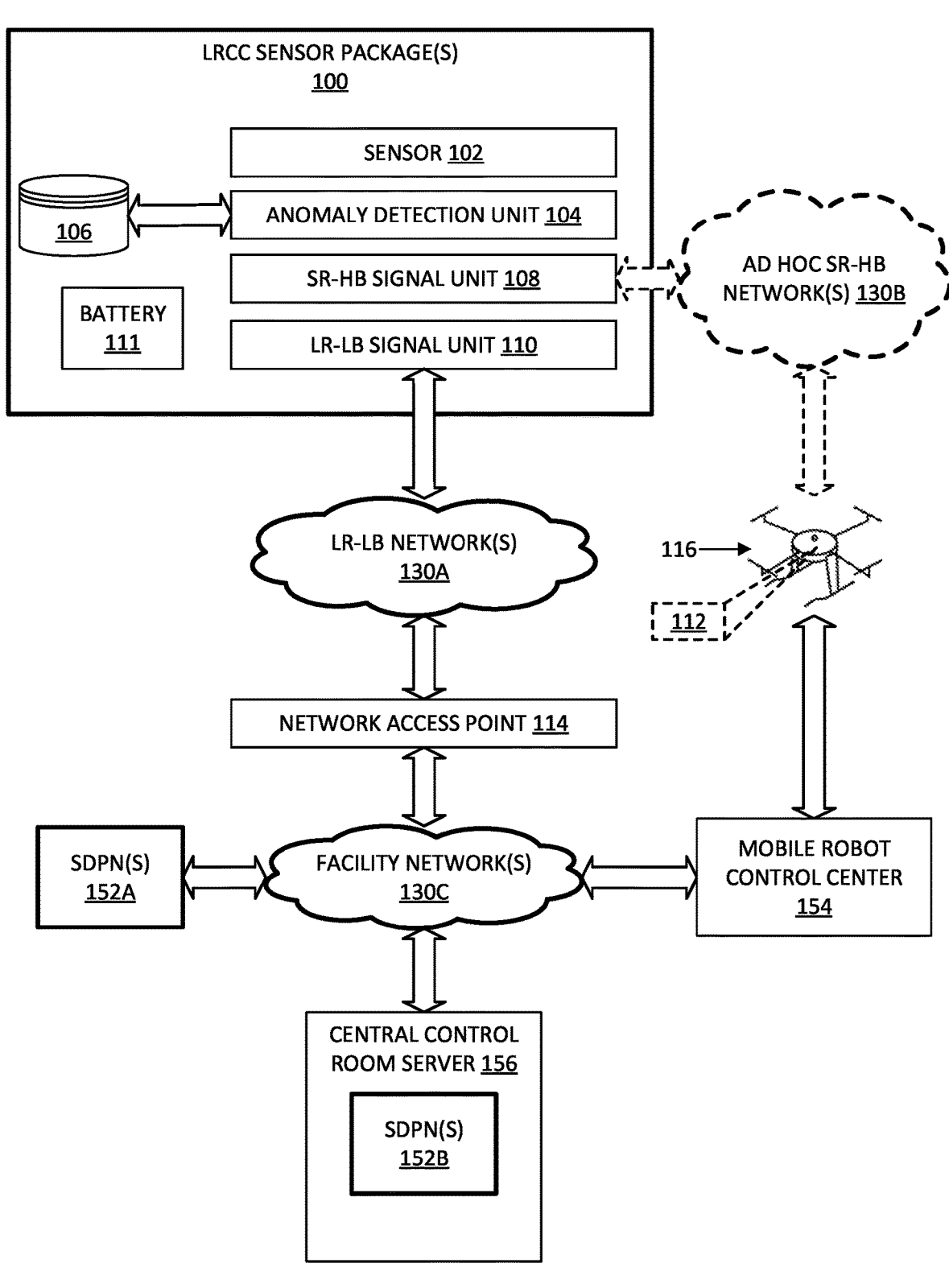
FIG. 1 illustrates an example environment in which aspects of the present disclosure may be implemented.

FIG. 1 illustrates an example environment in which aspects of the present disclosure may be implemented. Sensor package(s) 100 may include one or more sensor(s) 102, one or more anomaly detection unit(s) 104, one or more SR-HB signal unit(s) 108, and one or more LR-LB signal unit(s) 110. Sensor package(s) 100 may be powered by one or more batteries 111. In some implementations, battery 111 may be recharged periodically using techniques such as solar power or via mains power. In some implementations, mobile robots configured with selected aspects of the present disclosure may carry chargers that can be carried to and used to recharge sensor package(s) 100. These sensor packages 100 may communicate wirelessly with one or more network access point(s) 114 to transmit, receive, and/or store information over at least one or more facility network(s) 130C, e.g., to downstream components such as SDPN(s) 152, mobile robot control center(s) 154, and/or central control room server(s) 156.

Anomaly detection unit(s) 104 may be configured to detect anomalies in data sensed by one or more sensor(s) 102. The criteria for what qualify as an "anomaly" may be predetermined and/or may be determined as sensor data is being processed. Some examples of what may qualify as an anomaly may be when one or more sensor value(s) at least fall outside one or more threshold value(s) or ranges, such when a pressure, temperature, and/or vibration value has a defined range (which may be inclusive or exclusive of the endpoint values), and a value is presented that is above or below that range. In another example, one or more sensor value(s) falling inside one or more range(s) may qualify as an anomaly. Storage 106 may store information relating to the anomaly detection unit 104, such as parameters or rules for what qualifies as an anomaly, previous anomalous detections, emissions/modulations resulting from a detection of anomalous data, machine learning model(s) (e.g., classifiers) trained to generate output indicative of anomalies based on sensor data, etc.

In various implementations, the detection of an anomaly by an anomaly detection unit 104 may initiate the modulation of a signal by SR-HB signal unit 108 and/or LR-HB signal unit 110. This in turn may cause a mobile robot to be summoned within SR-HB unit range of the sensor package in which the anomaly detection unit is located or within similarly close range of a separate sensor package.

SR-HB signal unit(s) 108 may be configured to modulate one or more short-range high-bandwidth signal(s), e.g., in response to one or more sensor(s) 102 sensing one or more characteristics of a monitored aspect of the industrial facility. The data encoded in the modulated signal may be raw sensor data and/or may relate to, for instance, one or more anomalies detected by one or more sensor(s) 102. For instance, in response to determining that an anomaly detection unit 104 has detected one or more anomalies, the SR-HB signal unit 108 may modulate a SR-HB signal to include all or substantial parts of sensor data from which the anomaly was detected. As another example, in response to determining that a LR-LB signal unit 110 is modulating a LR-LB signal, the SR-HB signal unit 108 may also modulate a SR-HB signal. SR-HB signal unit 108 may interface with one or more WAP 112 networks 130B. In some implementations, to conserve battery power, SR-HB signal unit 108 may only begin modulating and transmitting an SR-HB wireless signal upon copresence of a mobile robot 116 carrying a WAP 112. For example, upon entering SR-HB range of the sensor package 100, the mobile robot 116 may request a SR-HB connection, which may indicate copresence.

LR-LB signal unit(s) 110 may modulate one or more LR-LB signal(s) in response to one or more sensor(s) 102 sensing one or more characteristics of a monitored aspect. The data encoded in the modulated signal may relate to anomalies detected by one or more sensor(s) 102. For instance, in response to determining that an anomaly detection unit 104 has detected one or more anomalies, the LR-HB signal unit 110 may modulate a LR-LB signal. A LR-LB signal unit 110 may interface with one or more networks, such as 130A and/or 130C, which may be outside a range of SR-HB signal unit 108.

Network(s) 130A-C may be used to communicate data between sensor package(s) 100, network access point(s) 114, SDPN(s) 152, mobile robot control center(s) 154, and/or central control room server(s) 156. Facility network(s) 130C, for instance, may include one or more LANs, and may utilize wired technology such as Ethernet and wireless technologies such as Wi-Fi. Network access point(s) 114 are points in an industrial facility in which it is possible to interface with one or more facility network(s) 130C. Examples of network access point(s) 114 may include routers, modems, wireless access points, etc. Network access point(s) may be intermediaries between LR-LB network channel(s) 130A and process automation network(s) 130, in addition to other functions within a facility.

Mobile robot control center(s) 154 may control and/or direct at least one or more mobile robot(s) 116 autonomously or at the direction of a separate input, such as a separate input coming from a central control room server 156. For example, mobile robot control center(s) 154 may receive one or more summons carried in LR-LB signals transmitted by LR-LB signal unit 110. Mobile robot center(s) 154 may responsively deploy one or more mobile robot(s) 116 to targeted areas of the industrial facility in response. Mobile robot(s) 116 may be configured to transport one or more WAPs 112 within range SR-HB signal unit 108 so as to establish ad hoc SR-HB network(s) 130B. Central control room (CCR) server(s) 156 analyze, control, and/or delegate control over aspects of the facility. For example, CCR server 156 may operate a SDPN 152B. In some cases, a SDPN 152A may be operated elsewhere, e.g., on its own server, on a distributed control node (DCN), etc.

FIG. 1 is intended only as one example for purposes of illustrating some implementations. Many other configurations are possible having more, fewer, and/or different components than the example environment depicted in FIG. 1.

Figure 2:
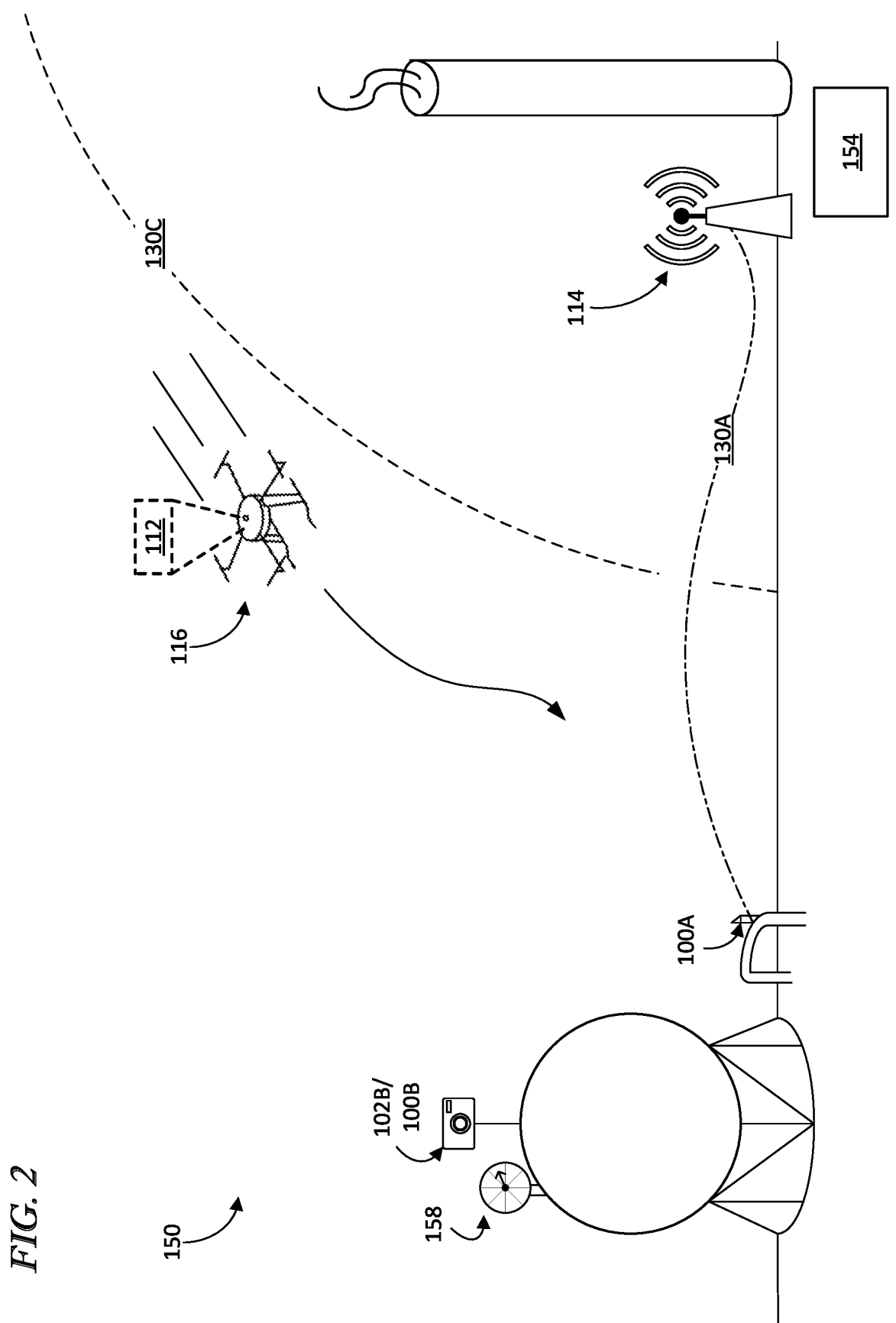
FIG. 2, FIG. 3, and FIG. 4 depict various scenarios in which selected aspects of the present disclosure may be implemented, in accordance with various embodiments.
Figure 3:
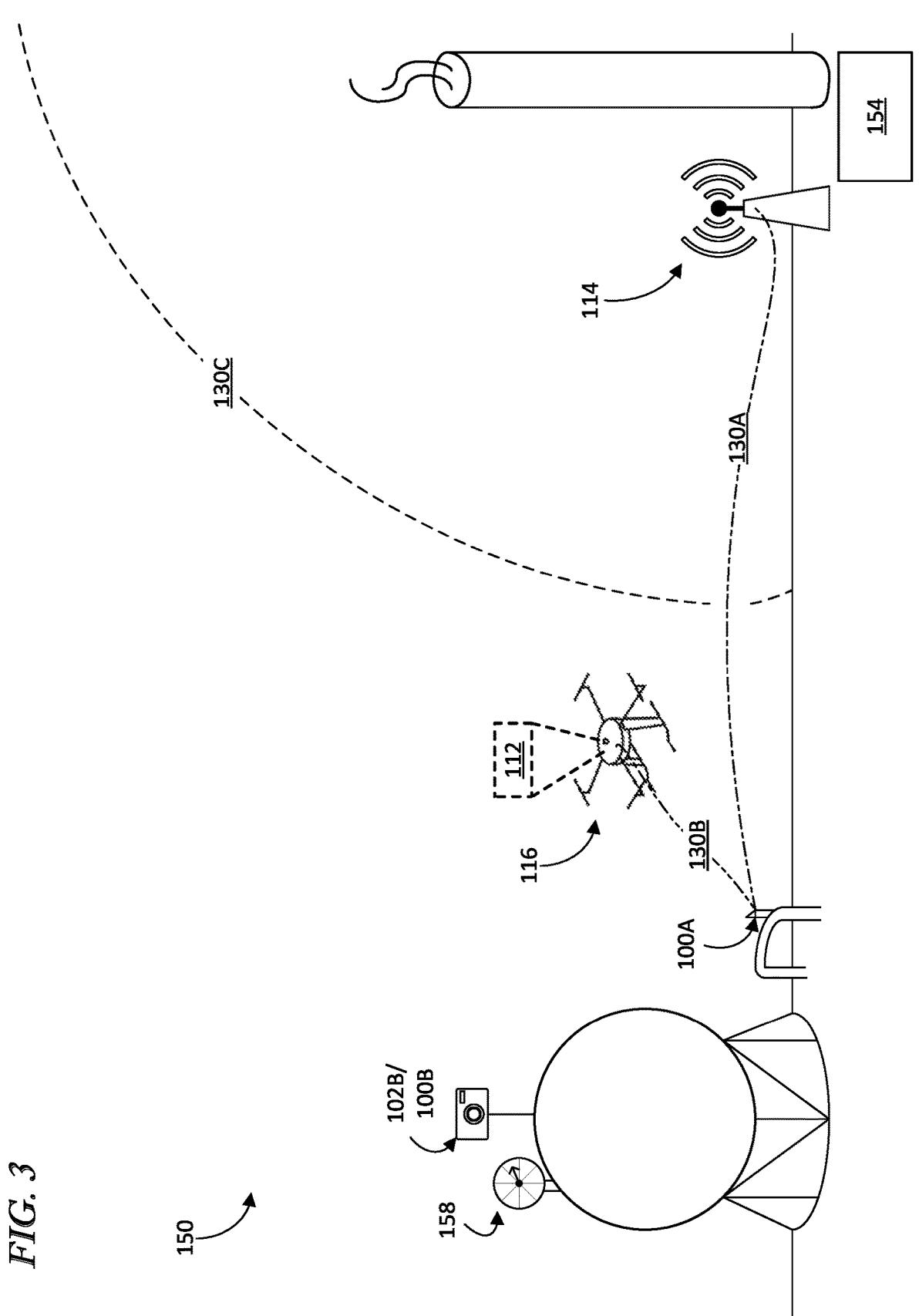
Figure 4:
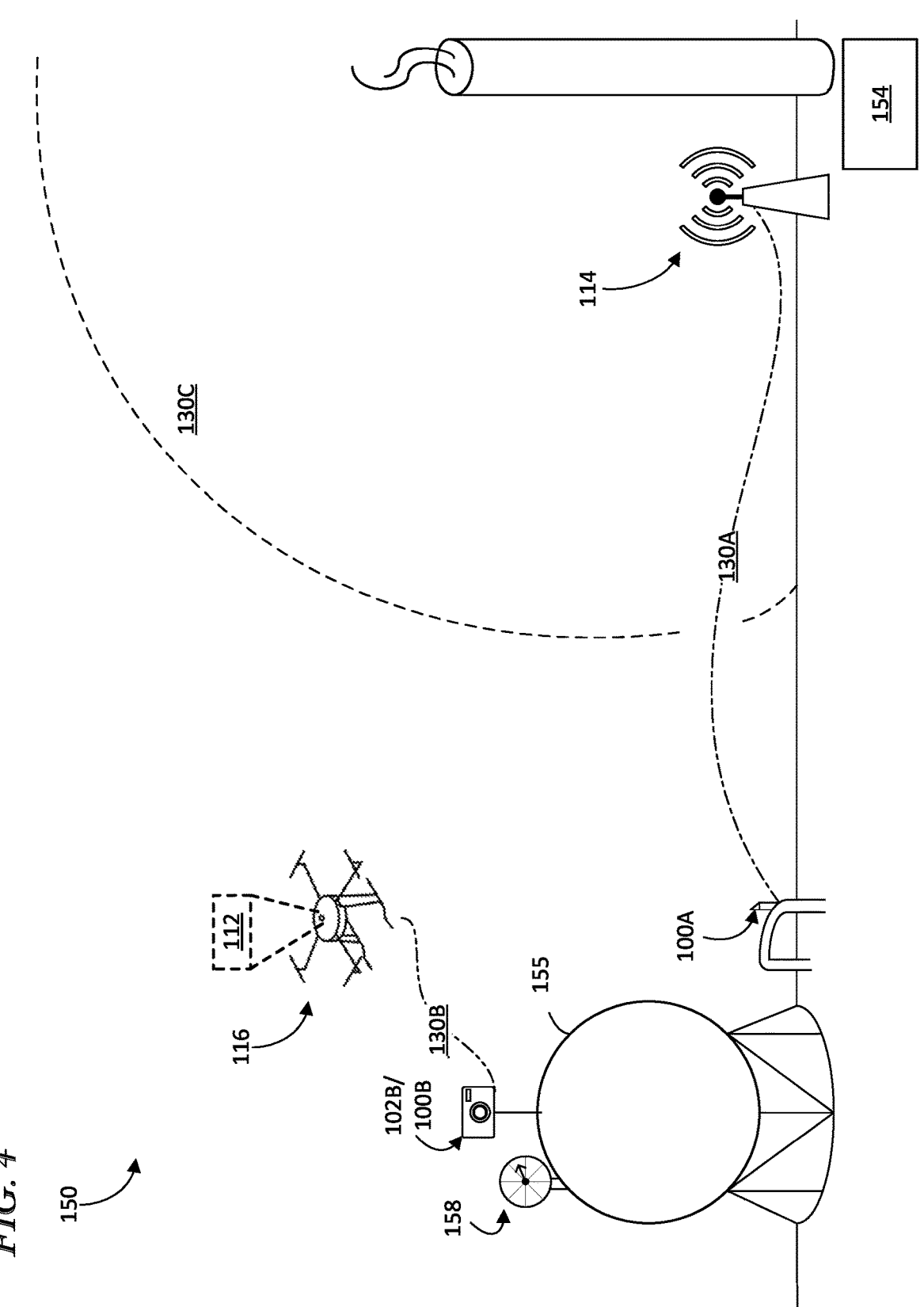

Referring now to the generally shared aspects of FIGS. 2-4, an example facility 150 in which various aspects of the present disclosure may be implemented is depicted schematically. Facility 150 may take numerous forms and may be designed to implement any number of sensor-monitored processes. For example, facility 150 may form all or part of a chemical processing plant, an oil or natural gas refinery, a catalyst factory, a manufacturing facility, etc. Facility 150 may include at least one or more facility network(s) 130C, one or more network access points 114, one or more deployed LRCC sensor package(s) 100, and one or more mobile robot control centers 154.

A variety of LRCC sensor package(s) 100 may be located within facility 150. In some implementations, one or more sensor package(s) 100 may be deployed remotely from facility network 130C/network access point 114 and therefore may be limited to constrained long-range communications. Each sensor package 100 may have one or more roles to play in the facility 150. For instance, a sensor package 100 may both monitor and/or record data and create a secondary output enabling equipment (such as an actuator) to engage or disengage as a result of the monitored and/or recorded data.

One or more mobile robots 116 may be utilized in the facility 150 for at least monitoring, inspecting, recording, and/or transmitting data derived from one or more sensor(s) 102 and/or sensor package(s) 100. A mobile robot 116 may travel to at least one or more sensors 102 and/or sensor packages 100. A mobile robot 116 may be equipped with a WAP 112 and/or a memory storage system, among other devices. In some implementations, mobile robot(s) 116 may be configured to transport a WAP 112 and a memory storage system. The memory storage system may be used record data transmitted from sensor package(s) 100 and then transmit the recorded data over a WAP 112 to network access point 114 once the WAP 112 is within communications range.

The mobile robot control center 154 may directly or indirectly receive signals (e.g., summons) from one or more sensor package(s) 100 and/or mobile robot(s) 116 directing the mobile robot control center 154 to deploy one or more mobile robots 116 to one or more sensor package(s) 100.

In FIG. 2, a first LRCC sensor package 100A is deployed on a pipe. For example, LRCC sensor package 100A may include a vibration sensor that is configured to monitor the pipe's vibration. In various implementations, first LRCC sensor package 100A may, by way of an onboard anomaly detection unit (not depicted in FIG. 2), monitor a portion or subset of raw sensor data generated by the sensor (not depicted in FIG. 2) that is onboard LRCC sensor package 100A.

In response to the anomaly detection unit of sensor package 100A detecting an anomaly—e.g., detected vibrations are too frequent, infrequent, irregular, severe, etc. as compared to one or more thresholds—the sensor package 100A modulates a LR-LB signal over LR-LB network 130A, which may be received by a network access point 114. Network access point 114 enables information carried in the LR-LB signal to be relayed downstream, e.g., to mobile robot control center 154, without one or more mobile robot(s) 116 having to bring a WAP 112 into range. In response to the LR-LB signal being received, e.g., by mobile robot control center 154, a mobile robot 116 configured to transport a WAP 112 is summoned to sensor package 100A, as depicted in FIG. 2.

In FIG. 3, mobile robot 116 has reached its destination of being within SR-HB range of sensor package 100A, at which point ad hoc SR-HB network 130B may be established. Upon arriving at its destination and establishing ad hoc SR-HB network 130B, WAP 112 may begin receiving the SR-HB signal carried over SR-HB network 130B. In some implementations, the SR-HB signal may be processed by mobile robot 116 to record data locally in onboard memory. In some implementations, the SR-HB signal may carry raw sensor data generated by sensor package 100A, such as all the vibration sensor data. This raw sensor data may contrast with a subset of sensor data that was processed by the onboard anomaly detection unit of LRCC sensor package 100A. Once the data is received, mobile robot 116 may then carry that memory back to within range of network access point 114 and hence, facility network 130C.

FIG. 4 depicts operations that can happen in addition to, or as alternative to, those depicted in FIG. 3. Notably, in FIG. 4, mobile robot 116 is configured to transport a WAP 112 to a second LRCC sensor package 100B (or standalone sensor 102B in some cases) that is different than first LRCC sensor package 100A. In other words, second LRCC sensor package 100B is not the sensor package 100A that modulated the LR-LB signal to summon mobile robot 116. Nonetheless, mobile robot 116 carrying the WAP 112 is summoned to second LRCC sensor package 100B.

In cases in which second sensor package 100B includes communication capabilities, mobile robot 116 may bring the WAP 112 into SR-HB range of an SR-HB signal unit (not depicted) of sensor package 100B, similar to the operations of FIG. 3. In FIG. 4, second LRCC sensor package 100B includes, as its onboard sensor 102B, a digital camera that is pointed at, and thereby monitors, a gauge 158. Gauge 158 may be a standalone sensor that is incapable of network communication, and therefore is monitored by LRCC sensor package 100B. For instance, gauge 158 may measure pressure within industrial structure 155. In other implementations, digital camera 102B may monitor other types of gauges, or even other aspects of an industrial facility, such as flames, smoke, or steam emanating from a chimney.

In other cases, second LRCC sensor package 100B may be omitted, and mobile robot 116 may instead monitor gauge 158 directly. For example, mobile robot 116 may be equipped with equipment (e.g., a digital camera) configured to extract data from the standalone gauge 158 and transmit extracted data to one or more network access point(s) 114 and/or facility network(s) 130.

FIG. 5 is a flowchart illustrating an example method 510 for practicing selected aspects of the present disclosure, in accordance with implementations disclosed herein. For convenience, the operations of the flow chart are described with reference to a system that performs the operations. This system may include various components of various computer systems, such as a WAP 112. Moreover, while operations of method 510 are shown in a particular order, this is not meant to be limiting. As such, one or more operations may be reordered, omitted, or added.

At block 502, the system may monitor one or more aspects of an industrial process facility through one or more LRCC sensor packages. In various implementations, the monitoring of block 502 includes operating said one or more LRCC sensor packages to, at block 504, generate one or more sensor signals. The monitoring of block 502 may further include, at block 506, analyzing the one or more sensor signals (or data stored in memory that is indicative thereof) locally at the one or more LRCC sensor packages to detect one or more anomalies of the one or more monitored aspects of the industrial process facility.

The monitoring of block 502 may further include, at block 508, determining whether an anomaly was detected. If the answer at block 508 is no, then method 500 returns to block 506. However, if at block 508 the answer is yes, then method 500 may proceed to block 510. At block 510, responsive to detecting one or more anomalies at block 508, a LR-LB signal may be modulated by one or more of the LRCC sensor packages to signal detection of the one or more anomalies in the monitored one or more aspects of the industrial process facility.

At block 512, the system, e.g., by way of mobile robot control center 154, may identify one or more LR-LB signals representing detection of one or more anomalies by the one or more LRCC sensor packages. In response to identifying one or more LR-LB signals at block 512, at block 514, the system, e.g., by way of mobile robot control center 154, may instruct one or more mobile robots to travel to an area of the industrial process facility to receive sensor data carried by a SR-HB signal emanating from that area. In various implementations, the SR-HB signal may be generated by the same LRCC sensor package that generated the LR-LB signal (e.g., as shown in FIG. 3) or may be generated by a separate LRCC sensor package than the LRCC sensor package that generated the LR-LB signal (e.g., as shown in FIG. 4).

Figure 6:
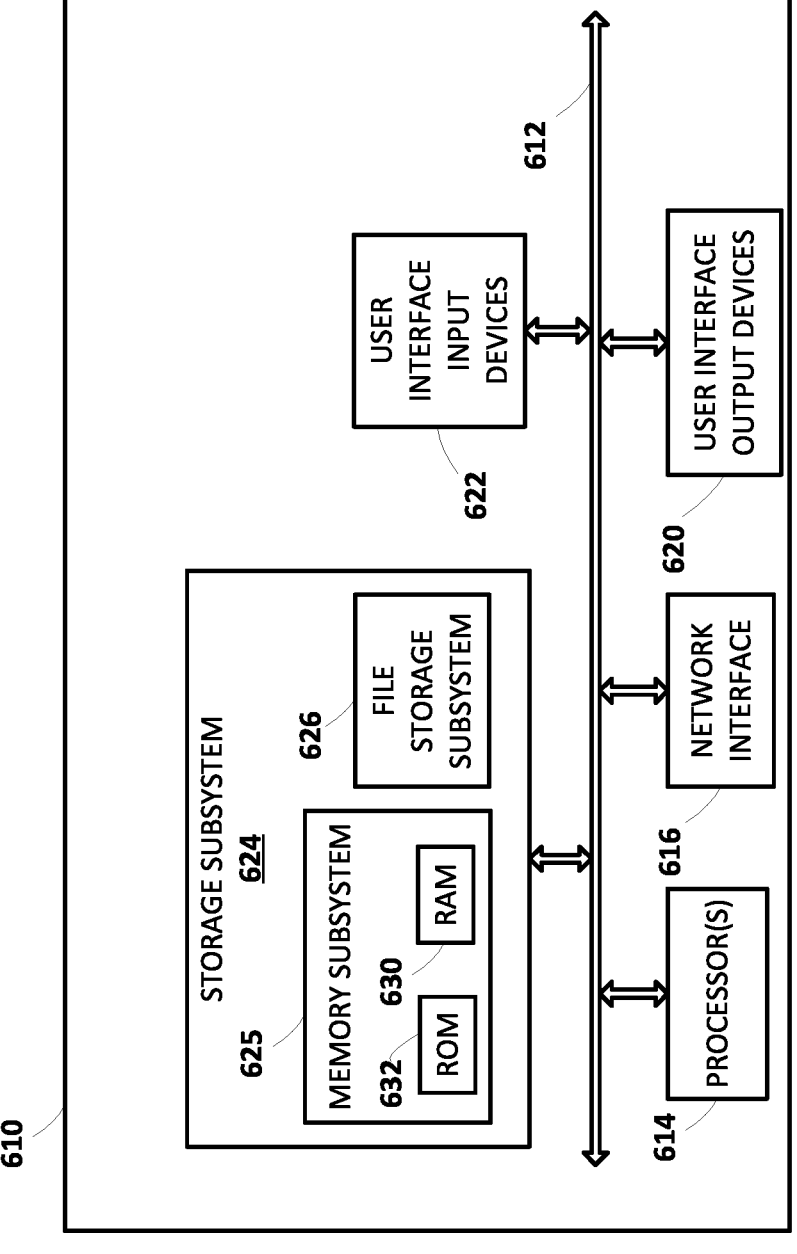
FIG. 6 illustrates an example computer architecture that may be configured to carry out selected aspects of the present disclosure.

FIG. 6 is a block diagram of an example computer system 610. Computer system 610 typically includes at least one processor 614 which communicates with a number of peripheral devices via bus subsystem 612. These peripheral devices may include a storage subsystem 626, including, for example, a memory subsystem 625 and a file storage subsystem 626, user interface output devices 620, user interface input devices 622, and a network interface subsystem 616. The input and output devices allow user interaction with computer system 610. Network interface subsystem 616 provides one or more network interfaces to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 626 stores programming and data constructs that provide the functionality of some or all of the modules described herein. For example, the storage subsystem 626 may include the logic to perform selected aspects of method 500, and/or to implement one or more components depicted elsewhere herein.

These software modules are generally executed by processor 614 alone or in combination with other processors. Memory used in the storage subsystem 626 can include a number of memories including a main random-access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem

626 in the storage subsystem 626, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A system comprising:
   one or more mobile robots, each configured to receive a summons and transport a wireless access point (WAP) in response to receipt of the summons;
   one or more sensor packages located remote from the one or more mobile robots, said one or more sensor packages configured to:
   generate, by one or more of the sensor packages, one or more sensor signals representing one or more aspects of an industrial process facility monitored by the one or more sensor packages;
   based on the one or more sensor signals, detect, by one or more of the sensor packages, one or more anomalies of the one or more monitored aspects of the industrial process facility;
   in response to detection of the one or more anomalies, modulate, by one or more of the sensor packages, the summons into a long-range low-bandwidth (LR-LB) signal transmitted by one or more of the sensor packages in the monitored one or more aspects of the industrial process facility to cause one or more of the mobile robots to travel to an area within short-range high-bandwidth (SR-HB) range of one or more of the sensor packages;

modulate, by one or more of the sensor packages, a SR-HB signal with data indicative of one or more of the sensor signals generated by one or more of the sensor packages; and transmit, by one or more of the sensor packages, the modulated SR-HB signal to the WAP transported by one or more of the mobile robots.

2. The system of claim 1, wherein the one or more mobile robots are further configured to:

patrol an area in which one or more of the sensor packages are deployed;

receive the LR-LB signal emitted by one or more of the sensor packages; and move into SR-HB range of one or more of the sensor packages upon receipt of said LR-LB signal.

3. The system of claim 1, further comprising:

a mobile robot controller configured to:

receive one or more LR-LB signals emitted by one or more of the sensor packages; and in response to receipt of said one or more LR-LB signals, direct one or more of the mobile robots to move within SR-HB range of the one or more sensor packages.

4. The system of claim 1, wherein the one or more sensor packages comprises a first sensor package and a second sensor package, and wherein:

the first sensor package:

detects one or more of the anomalies, and modulates the LR-LB signal with the summons to cause a given mobile robot of the one or more mobile robots to travel to within SR-HB range of the second sensor package; and the second sensor package modulates and transmits the SR-HB signal to the WAP carried by the given mobile robot.

5. The system of claim 4, wherein the first sensor package comprises a vibration sensor.

6. The system of claim 1, wherein one or more of the sensor packages, to which a given mobile robot of the one or more mobile robots is summoned, comprises a camera.

7. The system of claim 1, wherein one or more of the sensor packages comprises a sensor package configured to:

store raw sensor data based on one or more of the sensor signals;

analyze a subset of the raw sensor data to detect one or more of the anomalies; and modulate the SR-HB signal with more than the raw sensor data.

8. The system of claim 1, wherein the one or more mobile robots include one or more unmanned aerial vehicles (UAVs).

9. A long-range communication constrained (LRCC) sensor package for deployment in an industrial process facility, the LRCC sensor package comprising:

a sensor configured to generate one or more sensor signals representing one or more aspects of the industrial process facility monitored by the LRCC sensor package;

a long-range low-bandwidth (LR-LB) transmitter;

an onboard anomaly detection unit configured to:

based on the one or more sensor signals, detect, by the onboard anomaly detection unit of the LRCC sensor package, one or more anomalies of the one or more monitored aspects of the industrial process facility, and in response to detection of the one or more anomalies in the monitored one or more aspects of the industrial process facility, modulate, by the onboard anomaly detection unit of the LRCC sensor package, a signal transmitted by the LR-LB transmitter of the LRCC sensor package with a summons that causes one or more mobile robots to travel to an area of the industrial process facility and collect sensor data representative of one or more of the anomalies; and a short-range high-bandwidth (SR-HB) transmitter to transmit a signal modulated by the onboard anomaly detection unit of the LRCC sensor package with the sensor data representative of one or more of the anomalies.

10. The LRCC sensor package of claim 9, wherein the sensor comprises a camera.

11. The LRCC sensor package of claim 9, wherein the onboard anomaly detection unit is further configured to:

store raw sensor data based on one or more of the sensor signals; and analyze a subset of the raw sensor data to detect one or more of the anomalies.

12. The LRCC sensor package of claim 11, wherein one or more of the mobile robots include a wireless access point (WAP) and a camera.

13. The LRCC sensor package of claim 9, wherein the summons modulated into the signal transmitted by the LR-LB transmitter causes one or more of the mobile robots to travel to a different sensor in a separate area of the industrial process facility from the LRCC sensor package to collect sensor data representative of one or more of the anomalies.

14. The LRCC sensor package of claim 13, wherein the different sensor is a camera.

15. The LRCC sensor package of claim 9, wherein the sensor comprises a vibration sensor.

16. A method comprising:

monitoring one or more aspects of an industrial process facility through one or more sensor packages, wherein the monitoring includes operating said one or more sensor packages to:

generate, by one or more of the sensor packages, one or more sensor signals, based on the one or more sensor signals, detect, by one or more of the sensor packages, one or more anomalies of the one or more monitored aspects of the industrial process facility, and responsive to detecting one or more anomalies, modulate, by one or more of the sensor packages, a long-range low-bandwidth (LR-LB) signal to include a summons for one or more mobile robots to travel to an area of the industrial process facility to receive sensor data carried by a short-range high-bandwidth (SR-HB) signal emanating from the area;

identifying one or more LR-LB signals that include the summons for one or more of the mobile robots; and instructing, in response to identifying one or more LR-LB signals, one or more mobile robots to travel to the area of the industrial process facility to receive the sensor data carried by the SR-HB signal emanating from the area.

17. The method of claim 16, further comprising:

receiving, in response to one or more of the mobile robots moving into range of the SR-HB signal, a transmission from a wireless access point (WAP) carried by the one or more mobile robots, said transmission containing the sensor data received from the SR-HB signal emanating from the area.

18. The method of claim 16, wherein the SR-HB signal is generated by the same sensor package that generated the LR-LB signal.

19. The method of claim 16, wherein the SR-HB signal is generated by a separate sensor package than the sensor package that generated the LR-LB signal.

20. The method of claim 16, wherein the one or more sensor packages include a camera.

\*  \*  \*  \*  \*